(12) United States Patent
Battle et al.

(10) Patent No.: US 11,327,757 B2
(45) Date of Patent: May 10, 2022

(54) PROCESSOR PROVIDING INTELLIGENT MANAGEMENT OF VALUES BUFFERED IN OVERLAID ARCHITECTED AND NON-ARCHITECTED REGISTER FILES

(71) Applicant: INTERNATIONAL BUSINESS MACHINES CORPORATION, Armonk, NY (US)

(72) Inventors: Steven J. Battle, Philadelphia, PA (US); Kurt A. Feiste, Austin, TX (US); Susan E. Eisen, Round Rock, TX (US); Dung Q. Nguyen, Austin, TX (US); Christian Gerhard Zoellin, Austin, TX (US); Kent Li, Austin, TX (US); Brian W. Thompto, Austin, TX (US); Dhivya Jeganathan, Austin, TX (US); Kenneth L. Ward, Austin, TX (US); Brian D. Barrick, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/120,979

(22) Filed: Dec. 14, 2020

(65) Prior Publication Data
US 2021/0342150 A1 Nov. 4, 2021

Related U.S. Application Data

(60) Provisional application No. 63/019,782, filed on May 4, 2020.

(51) Int. Cl.
*G06F 9/30* (2018.01)
*G06F 9/38* (2018.01)
(Continued)

(52) U.S. Cl.
CPC .......... *G06F 9/3013* (2013.01); *G06F 9/3824* (2013.01); *G06F 12/0238* (2013.01);
(Continued)

(58) Field of Classification Search
CPC ............... G06F 9/3824; G06F 9/30116; G06F 9/30138; G06F 9/30098; G06F 9/3012;
(Continued)

(56) References Cited

U.S. PATENT DOCUMENTS 4,030,072 A 6/1977 Bjomsson
5,530,817 A * 6/1996 Masubuchi ......... G06F 9/30032
712/24

(Continued)

OTHER PUBLICATIONS

Anonymous; Method to Prime and De-Prime the Accumulator Register for Dense Math Engine (MMA) Execution, IP.com, Jul. 27, 2020, pp. 1-6, USA.
(Continued)

*Primary Examiner* — Keith E Vicary
(74) *Attorney, Agent, or Firm* — Brian F. Russell; Brian Restauro

(57) ABSTRACT

In at least one embodiment, a processor includes architected and non-architected register files for buffering operands. The processor additionally includes an instruction fetch unit that fetches instructions to be executed and at least one execution unit. The at least one execution unit is configured to execute a first class of instructions that access operands in the architected register file and a second class of instructions that access operands in the non-architected register file. The processor also includes a mapper circuit that assigns physical registers to the instructions for buffering of operands. The processor additionally includes a dispatch circuit configured, based on detection of an instruction in one of the first and second classes of instructions for which correct operands do not reside in a respective one of the architected
(Continued)

and non-architected register files, to automatically initiate transfer of operands between the architected and non-architected register files.

20 Claims, 7 Drawing Sheets

(51) Int. Cl.
  *G06F 12/02* (2006.01)
  *G06F 12/0811* (2016.01)
  *G06F 12/0862* (2016.01)
  *G06F 12/1045* (2016.01)
(52) U.S. Cl.
  CPC ...... *G06F 12/0811* (2013.01); *G06F 12/0862* (2013.01); *G06F 12/1045* (2013.01)
(58) Field of Classification Search
  CPC .......... G06F 9/3013; G06F 9/34; G06F 9/342; G06F 9/384; G06F 9/30192; G06F 9/00–3897; G06F 15/00–825; G06F 9/30032
  See application file for complete search history.

(56) References Cited

U.S. PATENT DOCUMENTS

| | | | | |
|---|---|---|---|---|
| 5,835,748 | A * | 11/1998 | Orenstein | G06F 9/30109 712/217 |
| 5,845,307 | A * | 12/1998 | Prabhu | G06F 9/3012 711/2 |
| 6,237,083 | B1 * | 5/2001 | Favor | G06F 9/3885 712/217 |
| 6,339,823 | B1 * | 1/2002 | Loper, Jr. | G06F 9/3013 711/165 |
| 6,671,762 | B1 * | 12/2003 | Soni | G06F 9/462 710/267 |
| 9,081,501 | B2 | 7/2015 | Asaad et al. | |
| 10,146,535 | B2 | 12/2018 | Corbal et al. | |
| 2001/0001874 | A1 * | 5/2001 | Kishida | G06F 9/384 712/210 |
| 2004/0210741 | A1 * | 10/2004 | Glew | G06F 9/30189 712/217 |
| 2008/0189671 | A1 * | 8/2008 | Habib | G01R 31/31724 716/103 |
| 2009/0153897 | A1 * | 6/2009 | Blackmore | G06F 12/1036 358/1.15 |
| 2009/0198966 | A1 * | 8/2009 | Gschwind | G06F 9/30109 712/208 |
| 2011/0320765 | A1 * | 12/2011 | Karkhanis | G06F 9/30141 712/7 |
| 2015/0121040 | A1 * | 4/2015 | Weidner | G06F 9/3017 712/217 |
| 2020/0065109 | A1 * | 2/2020 | Shen | G06F 9/30043 |
| 2021/0064365 | A1 * | 3/2021 | Thompto | G06F 9/3012 |
| 2021/0173649 | A1 * | 6/2021 | Battle | G06F 17/16 |

OTHER PUBLICATIONS

Stallings, William; Computer Organization and Architecture, 9th Ed., Pearson, 2013, pp. 405-610, USA.

Anonymous; Dual Renaming Model of Accumulator Register for Dense Math Engine (Matrix Multiply Add) Execution, IP.com, Jul. 27, 2020, pp. 1-3, USA.

* cited by examiner

PROCESSOR PROVIDING INTELLIGENT MANAGEMENT OF VALUES BUFFERED IN OVERLAID ARCHITECTED AND NON-ARCHITECTED REGISTER FILES

BACKGROUND OF THE INVENTION

The present invention relates in general to data processing and, in particular, to a processor that provides intelligent management of values buffered in overlaid architected and non-architected register files.

A processor commonly includes multiple execution units that execute instructions of one or more hardware threads in parallel. In order to provide low latency access to source operands referenced by the execution units during execution of instructions and to destination operands generated by the execution of instructions, processors also generally include one or more sets of internal physical registers (often referred to as "register files") for buffering source and destination operands. Those register files that are exposed via the programming model of the processor to explicit reference by instructions are referred to as "architected register files." Other register files that are not exposed via the programming model to explicit reference by instructions are referred to as "non-architected register files." Within each architected register file, modern processors often implement a greater number of physical registers than the number of logical register names that can be explicitly referenced via the programming model in order to support register renaming and thus eliminate false data dependencies that can slow program execution.

BRIEF SUMMARY

In some embodiments, a processor includes an architected register file and a non-architected register file containing multiple physical registers that are not exposed via the programming model of the processor to explicit reference by user instructions. The processor is configured to access operands of a first class of instructions in the architected register file and to access operands of a second class of instructions in the non-architected register file. The non-architected register file is preferably overlaid with the architected register file, meaning that each physical register in the non-architected register file has a correspondence with at least one respective logical register name in the architected register file and that operands are transferred between the physical registers of the two register files in order to enable access to the operand data by both instructions in the first class and instructions in the second class.

A processor with the described overlaid register architecture may, when executing certain instruction sequences or when handling an interrupt or context switch, receive an instruction in the first class of instructions without first executing a user instruction to transfer source operands from the non-architected register file to the architected register file. Similarly, the processor may receive an instruction in the second class of instructions without first executing a user instruction to transfer source operands from the architected register file to the non-architected register file. The present disclosure appreciates that it would be desirable to avoid executing these instructions upon undefined source operands values. Accordingly, the processor is preferably configured to detect such instruction sequences and automatically transfer operands between the relevant physical registers in the overlaid register files.

In at least one embodiment, a processor includes an architected register file including a first plurality of physical registers for buffering operands and a non-architected register file including a second plurality of physical registers for buffering operands. Each physical register in the non-architected register file has a correspondence with at least one logical register name of the architected register file. The processor additionally includes an instruction fetch unit that fetches instructions to be executed and at least one execution unit configured to execute instructions. The at least one execution unit is configured to execute a first class of instructions that access operands in the architected register file and a second class of instructions that access operands in the non-architected register file. The processor also includes a mapper circuit that assigns physical registers within the first plurality of physical registers to the instructions to be executed for buffering of operands. The processor additionally includes a dispatch circuit that is configured, based on detection of an instruction to be executed in one of the first and second classes of instructions for which correct operands do not reside in a respective one of the architected register file and the non-architected register file, to automatically initiate transfer of operands between corresponding physical registers in the architected register file and the non-architected register file.

DETAILED DESCRIPTION

Figure 1:
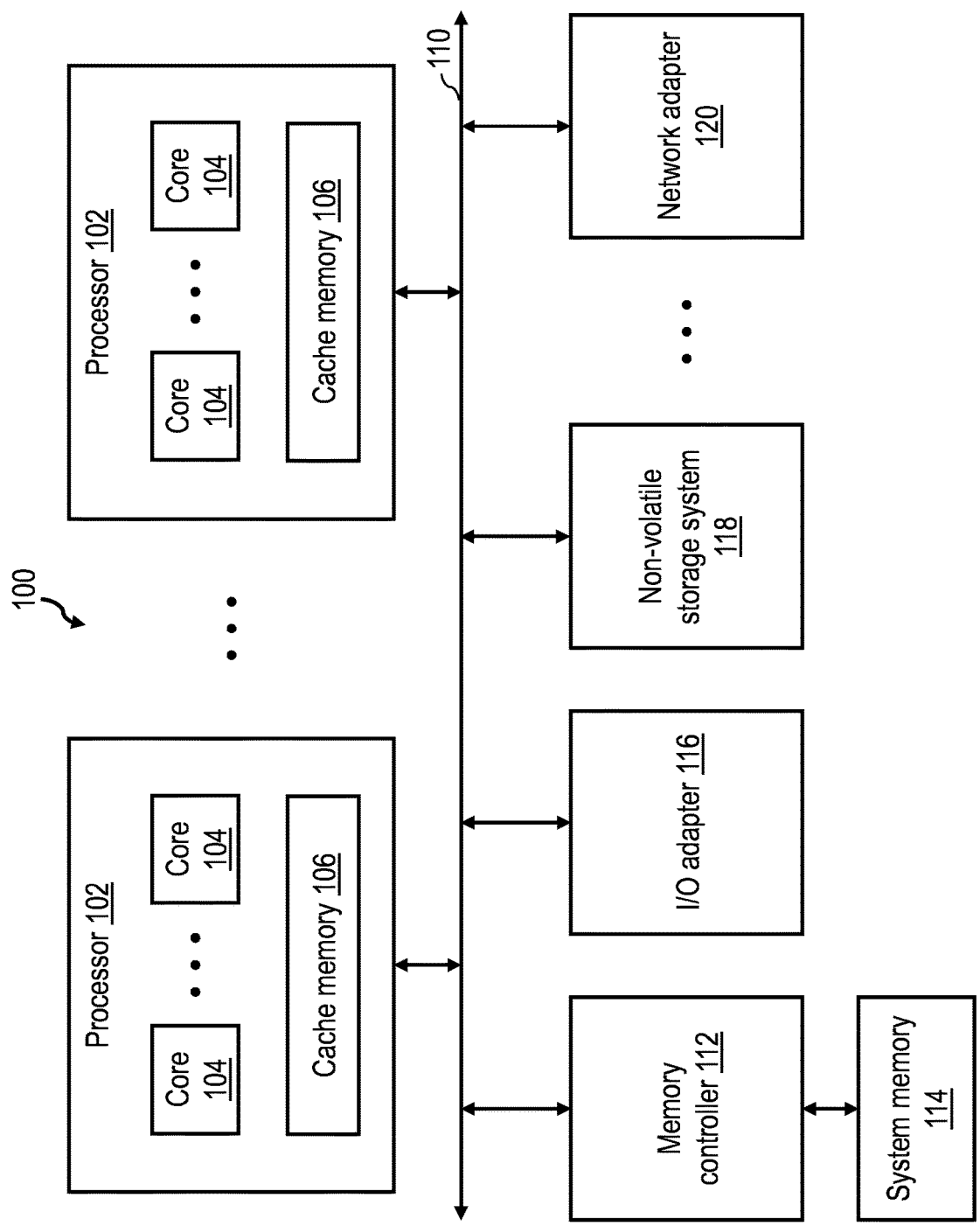
FIG. 1 is a high-level block diagram of a data processing system including a processor in accordance with one embodiment.

With reference now to the figures and in particular with reference to FIG. 1, there is illustrated a high-level block diagram of a data processing system 100 in accordance with one embodiment. In some implementations, data processing system 100 can be, for example, a server computer system (such as one of the POWER series of servers available from International Business Machines Corporation), a mainframe computer system, a mobile computing device (such as a smartphone or tablet), or a laptop or desktop personal computer system. In other implementations, data processing system 100 can alternatively be an embedded processor system.

As shown, data processing system 100 includes one or more processors 102 that process instructions and data. Each processor 102 may be realized as a respective integrated circuit having a semiconductor substrate in which integrated circuitry is formed, as is known in the art. In at least some embodiments, processors 102 can generally implement any one of a number of commercially available processor architectures, for example, POWER, ARM, Intel x86, NVidia, etc. In the depicted example, each processor 102 includes one or more processor cores 104 and cache memory 106 providing low latency access to instructions and operands likely to be read and/or written by processor cores 104. Processors 102 are coupled for communication by a system interconnect 110, which in various implementations may include one or more buses, switches, bridges, and/or hybrid interconnects.

Data processing system 100 may additionally include a number of other components coupled to system interconnect 110. These components can include, for example, a memory controller 112 that controls access by processors 102 and other components of data processing system 100 to a system memory 114. In addition, data processing system 100 may include an input/output (I/O) adapter 116 for coupling one or more I/O devices to system interconnect 110, a non-volatile storage system 118, and a network adapter 120 for coupling data processing system 100 to a communication network (e.g., a wired or wireless local area network and/or the Internet).

Those skilled in the art will additionally appreciate that data processing system 100 shown in FIG. 1 can include many additional non-illustrated components. Because such additional components are not necessary for an understanding of the described embodiments, they are not illustrated in FIG. 1 or discussed further herein. It should also be understood, however, that the enhancements described herein are applicable to data processing systems and processors of diverse architectures and are in no way limited to the generalized data processing system architecture illustrated in FIG. 1.

Figure 2:
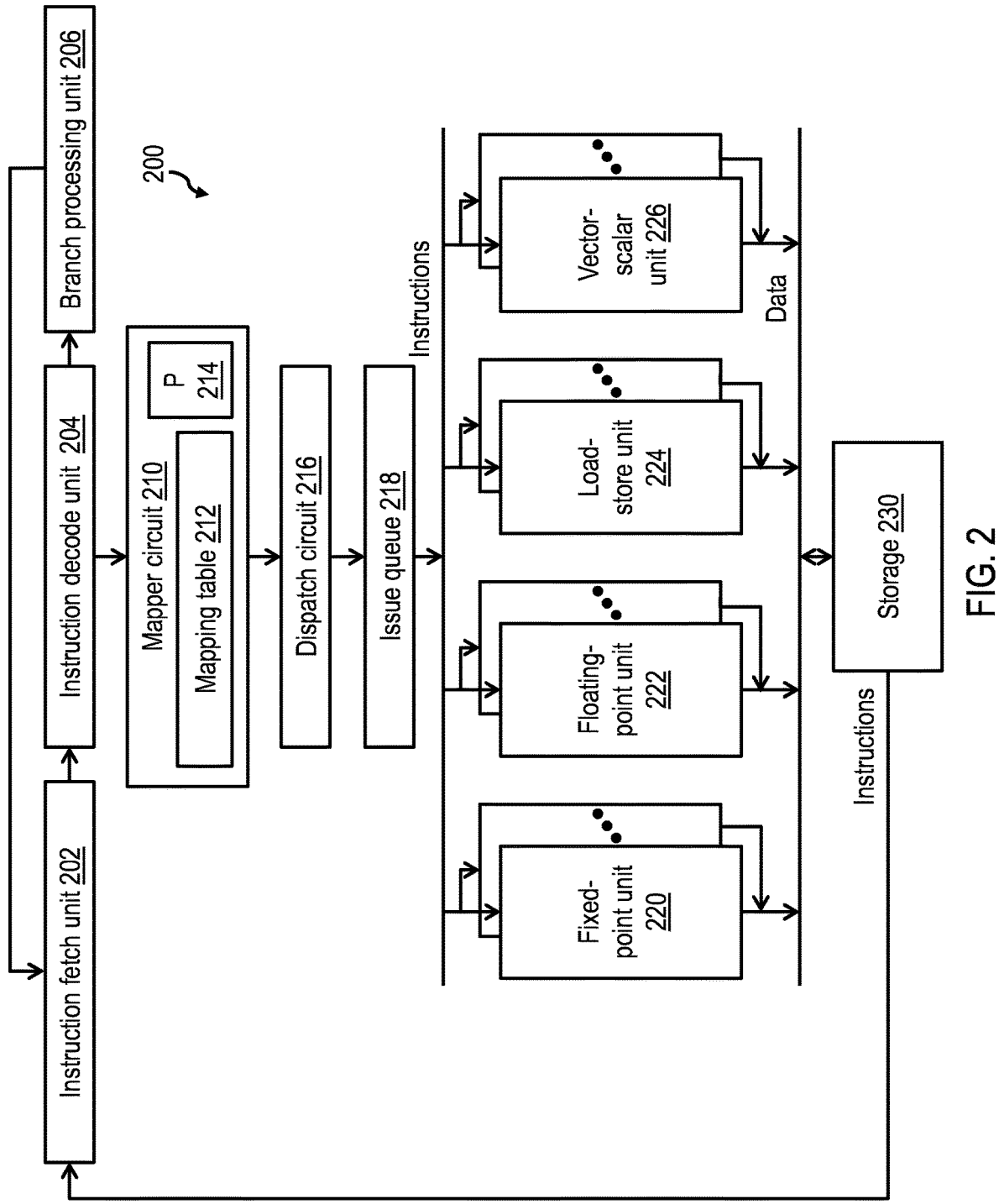
FIG. 2 is a high-level block diagram of a processor in accordance with one embodiment.

Referring now to FIG. 2, there is depicted a high-level block diagram of an exemplary processor 200 in accordance with one embodiment. Processor 200 may be utilized to implement any of processors 102 of FIG. 1.

In the depicted example, processor 200 includes an instruction fetch unit 202 for fetching instructions within one or more streams of instructions from storage 230 (which may include, for example, cache memories 106 and/or system memory 114 from FIG. 1). In a typical implementation, each instruction has format defined by the instruction set architecture of processor 200 and includes at least an operation code (opcode) field specifying an operation (e.g., fixed-point or floating-point arithmetic operation, vector operation, matrix operation, logical operation, branch operation, memory access operation, etc.) to be performed by processor 200. Certain instructions may additionally include one or more operand fields directly specifying operands or implicitly or explicitly referencing one or more registers storing source operand(s) to be utilized in the execution of the instruction and one or more registers for storing destination operand(s) generated by execution of the instruction. Instruction decode unit 204, which in some embodiments may be merged with instruction fetch unit 202, decodes the instructions retrieved from storage 230 by instruction fetch unit 202 and forwards branch instructions that control the flow of execution to branch processing unit 206. In some embodiments, the processing of branch instructions performed by branch processing unit 206 may include speculating the outcome of conditional branch instructions. The results of branch processing (both speculative and non-speculative) by branch processing unit 206 may, in turn, be utilized to redirect one or more streams of instruction fetching by instruction fetch unit 202.

Instruction decode unit 204 forwards instructions that are not branch instructions (often referred to as "sequential instructions") to mapper circuit 210. Mapper circuit 210 is responsible for the assignment of physical registers within the register files of processor 200 to instructions as needed to support instruction execution. Mapper circuit 210 preferably implements register renaming. Thus, for at least some classes of instructions, mapper circuit 210 establishes transient mappings between a set of logical (or architected) registers referenced by the instructions and a larger set of physical registers within the register files of processor 200. As a result, processor 200 can avoid unnecessary serialization of instructions that are not data dependent, as might otherwise occur due to the reuse of the limited set of architected registers by instructions proximate in program order. Mapper circuit 210 maintains a mapping data structure, referred to herein as mapping table 212, which is utilized to track free physical registers, transient mappings between logical register names and physical registers, and data dependencies between instructions. One exemplary embodiment of mapping table 212 is described below with reference to FIG. 5. As further illustrated in FIG. 2, mapper circuit 210 also preferably maintains prime state information 214, which tracks whether the physical registers of an architected register file or a non-architected register file overlaid on the architected register file contains the most up-to-date operand values associated with a set of logical register names. An exemplary embodiment of a set of prime state registers for storing prime state information 214 is described below with reference to FIG. 6.

Still referring to FIG. 2, processor 200 additionally includes a dispatch circuit 216 configured to ensure that any data dependencies between instructions are observed and to dispatch sequential instructions as they become ready for execution. Instructions dispatched by dispatch circuit 216 are temporarily buffered in an issue queue 218 until the execution units of processor 200 have resources available to execute the dispatched instructions. As the appropriate execution resources become available, issue queue 218 issues instructions from issue queue 218 to the execution units of processor 200 opportunistically and possibly out-of-order with respect to the original program order of the instructions.

In the depicted example, processor 200 includes several different types of execution units for executing respective different classes of instructions. In this example, the execution units includes one or more fixed-point units 220 for executing instructions that access fixed-point operands, one or more floating-point units 222 for executing instructions that access floating-point operands, one or more load-store units 224 for loading data from and storing data to storage 230, and one or more vector-scalar units 226 for executing instructions that access vector and/or scalar operands. In a typical embodiment, each execution unit is implemented as a multi-stage pipeline in which multiple instructions can be simultaneously processed at different stages of execution. Each execution unit preferably includes or is coupled to access at least one register file including a plurality of physical registers for temporarily buffering operands accessed in or generated by instruction execution.

Those skilled in the art will appreciate that processor 200 may include additional unillustrated components, such as logic configured to manage the completion and retirement of instructions for which execution by execution units 220-226 is finished. Because these additional components are not necessary for an understanding of the described embodiments, they are not illustrated in FIG. 2 or discussed further herein.

Figure 3:
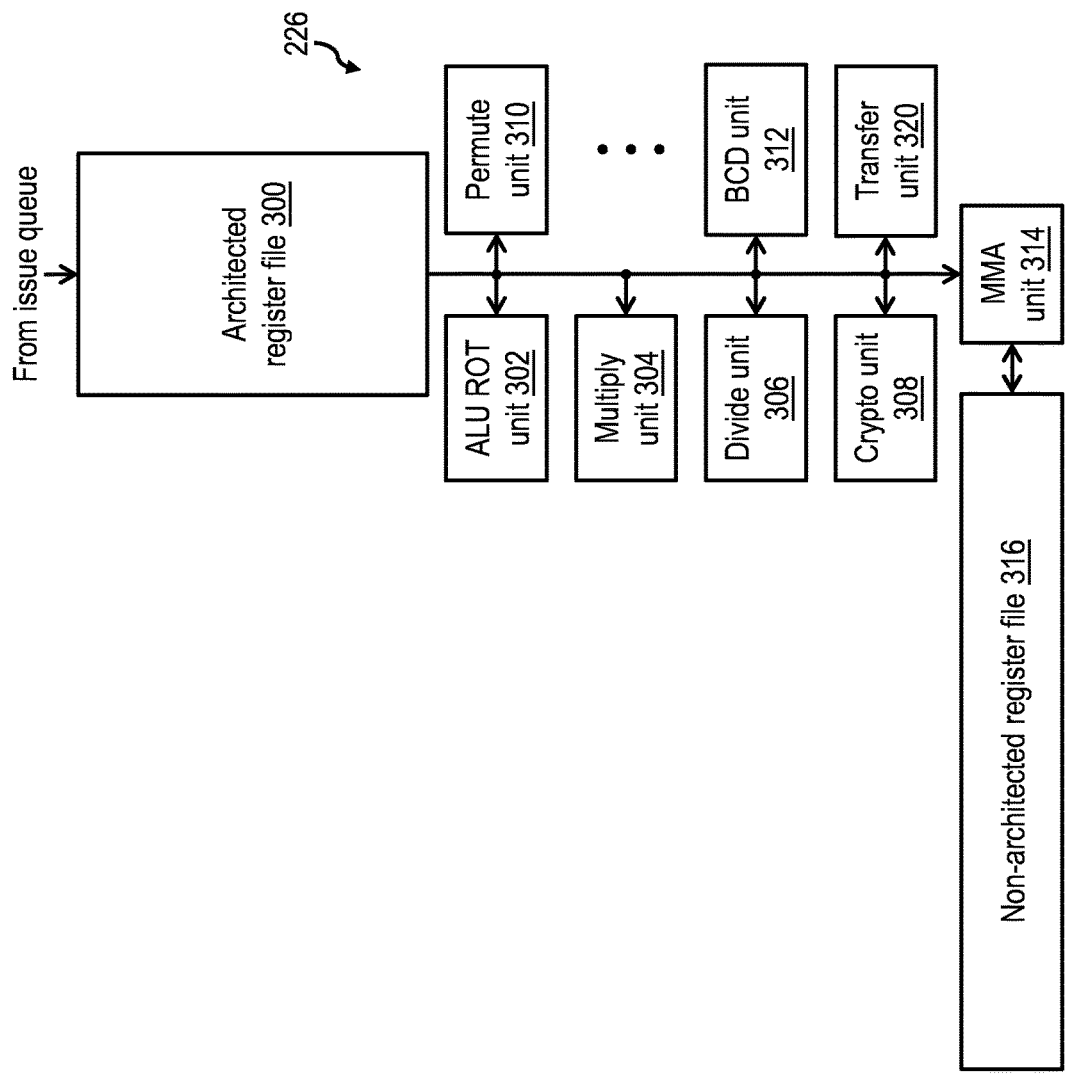
FIG. 3 is a high-level block diagram of an exemplary execution unit of a processor in accordance with one embodiment.

With reference now to FIG. 3, there is illustrated a high-level block diagram of an exemplary execution unit of a processor in accordance with one embodiment. In this example, a vector-scalar unit 226 of processor 200 is shown in greater detail. It should be appreciated, however, that the principles and techniques described herein can be applied to other or additional execution units and/or execution units that execute other classes of instructions.

In the embodiment of FIG. 3, vector-scalar unit 226 is configured to execute at least two different classes of instructions that operate on and generate different types of operands. In particular, vector-scalar unit 226 is configured to execute a first class of instructions that operate on vector and scalar source operands and that generate vector and scalar destination operands. Vector-scalar unit 226 executes instructions in this first class of instructions in functional units 302-312, which in the depicted embodiment include an arithmetic logic unit/rotation unit 302 for performing addition, subtraction, and rotation operations, a multiply unit 304 for performing binary multiplication, a divide unit 306 for performing binary division, a cryptography unit 308 for performing cryptographic functions, a permute unit 310 for performing operand permutations, and binary-coded decimal (BCD) unit 312 for performing decimal mathematical operations. The vector and scalar source operands on which these operations are performed and the vector and scalar destination operands generated by these operations are buffered in the physical registers of an architected register file 300.

Vector-scalar unit 226 is additionally configured to execute a second class of instructions that operate on matrix operands and that generate matrix operands. Vector-scalar unit 226 executes instructions in this second class of instructions in a matrix multiply-accumulate (MMA) unit 314. The matrix operands on which these operations are performed and the matrix operands generated by these operations are buffered and accumulated in the physical registers of a non-architected register file 316.

In operation, instructions are received by vector-scalar unit 226 from issue queue 218. If an instruction is in the first class of instructions (e.g., vector-scalar instructions), the relevant source operand(s) for the instruction are accessed in architected register file 300 utilizing the mapping between logical and physical registers established by mapper circuit 210 and then forwarded with the instruction to the relevant one of functional units 302-312 for execution. The destination operand(s) generated by that execution are then stored back to the physical register(s) of architected register file 300 determined by the mapping established by mapper circuit 210. If, on the other hand, the instruction is in the second class of instructions (e.g., MMA instructions), the instruction is forwarded to MMA unit 314 for execution with respect to operand(s) buffered in specified physical registers of non-architected register file 316. In this case, the execution by MMA unit 314 includes performing a matrix multiplication operation followed by accumulation (e.g., summing) of the resulting product with the contents of one or more specified physical registers in non-architected register file 316.

It should be noted that in a preferred embodiment processor 200 is configured such that non-architected register file 316 cannot be directly accessed by instructions of the first class (e.g., vector-scalar instructions) and that physical registers 400 cannot be directly accessed by instructions of the second class (e.g., MMA instructions). However, it is nevertheless desirable to enable access to and modification of operands by both MMA unit 314 and one or more of functional units 302-312. To support this capability, vector-scalar unit 226 preferably additionally includes a transfer unit 320 for transferring operands between architected register file 300 and non-architected register file 316. In one embodiment, transfer unit 320, in response to receipt of a first register transfer instruction referred to herein as a "prime" instruction, transfers one or more operands from architected register file 300 to non-architected register file 316. Transfer unit 320, responsive to receipt of a second register transfer instruction referred to herein as a "de-prime" instruction, transfers one or more operands from non-architected register file 316 to architected register file 300.

According to one aspect of the disclosed embodiments, the operands buffered in non-architected register file 316 are, by definition, not subject to direct reference by the MMA instruction. That is, because non-architected register file 316 is not an architected register file, non-architected register file 316 (unlike architected register file 300) does not have its own associated set of architected or logical register names (identifiers) that can be explicitly referenced by an MMA instruction to designate source and destination operands. The designation of operands by MMA instructions is instead enabled by "overlaying" non-architected register file 316 and architected register file 300 to establish a correspondence between the logical register names of architected register 300 and the physical registers of non-architected register file 316. In a preferred embodiment, the correspondence between the logical register names of architected register 300 and the physical registers of non-architected register file 316 is fixed rather than transient, meaning that mapper circuit 210 and mapping table 212 need not maintain any mapping data structure to translate a logical register name of architected register 300 to the physical registers of non-architected register file 316.

Figure 4:
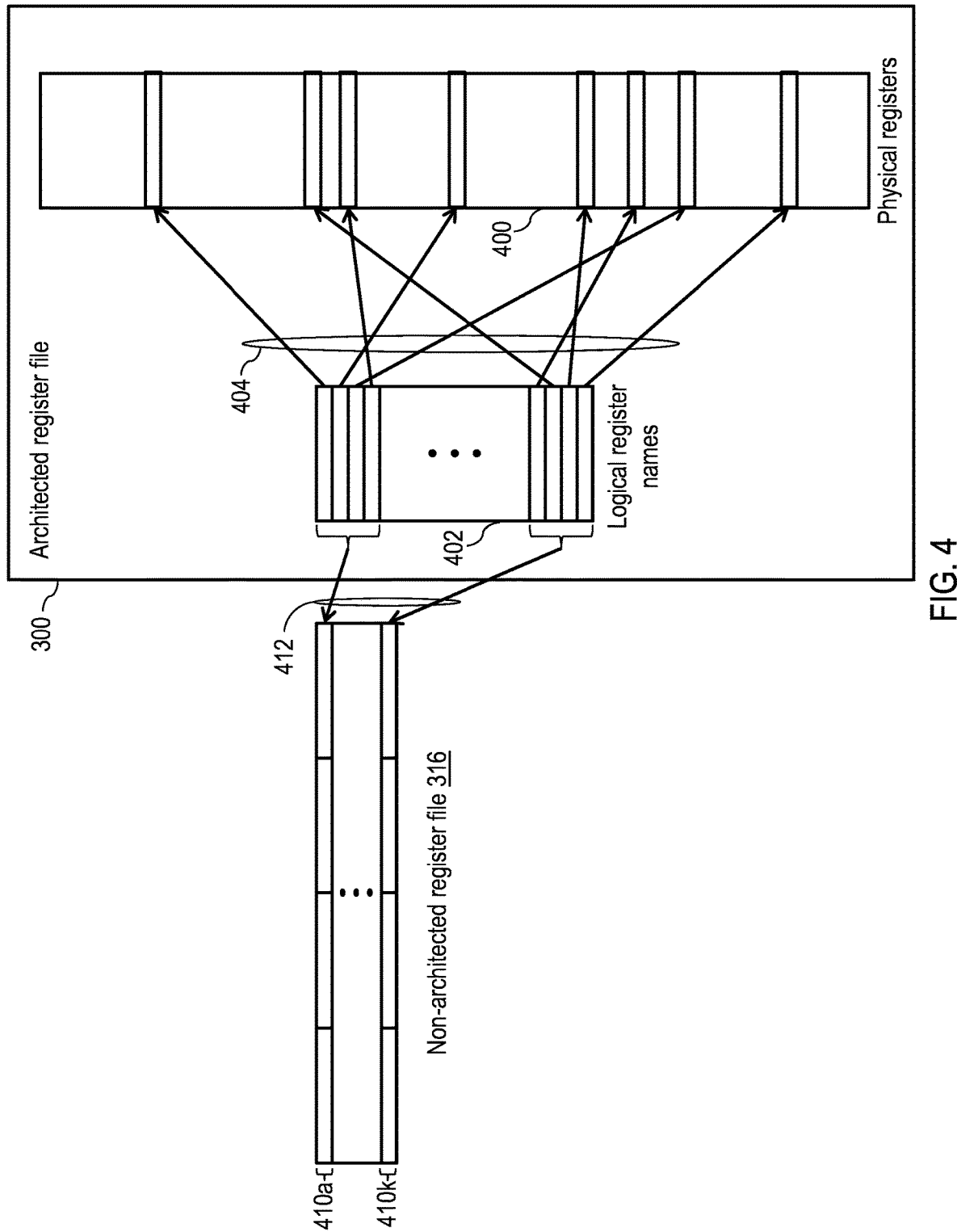
FIG. 4 is a high-level block diagram of exemplary overlaid register architecture in accordance with one embodiment.

Referring now to FIG. 4, there is depicted a high-level diagram of an overlaid register architecture as employed by processor 200 in accordance with one embodiment. In this example, architected register file 300 of FIG. 3 includes a plurality of physical registers 400, which includes a greater number of physical registers 400 than the number of architected or logical register names 402 that can be explicitly referenced by instructions. For example, architected register file 300 may implement 60 or more physical registers 400, while only implementing 32 logical register names 402. As indicated in FIG. 4 by arrows 404, mapper circuit 210 establishes transient mappings between certain logical register names 402 and physical registers 400 to support register renaming as previously described. Physical registers 400 all have an equal length, for example, of 128 bits (i.e., 16 bytes).

FIG. 4 further illustrates non-architected register file 316 of FIG. 3 as including a plurality of physical registers 410a-410k for buffering matrix operands. Each physical register 410 has a correspondence with one or more logical register names 402. For example, in one embodiment, each physical register 410 may have a length of 512 bits and have a fixed correspondence with four consecutive logical register names 402 of architected register file 300, as indicated by arrows 412. With this arrangement, an instruction of the second class (e.g., an MMA instruction) can indirectly specify operand registers by referencing logical register names 402 of architected register file 300.

Figures 5, 6:
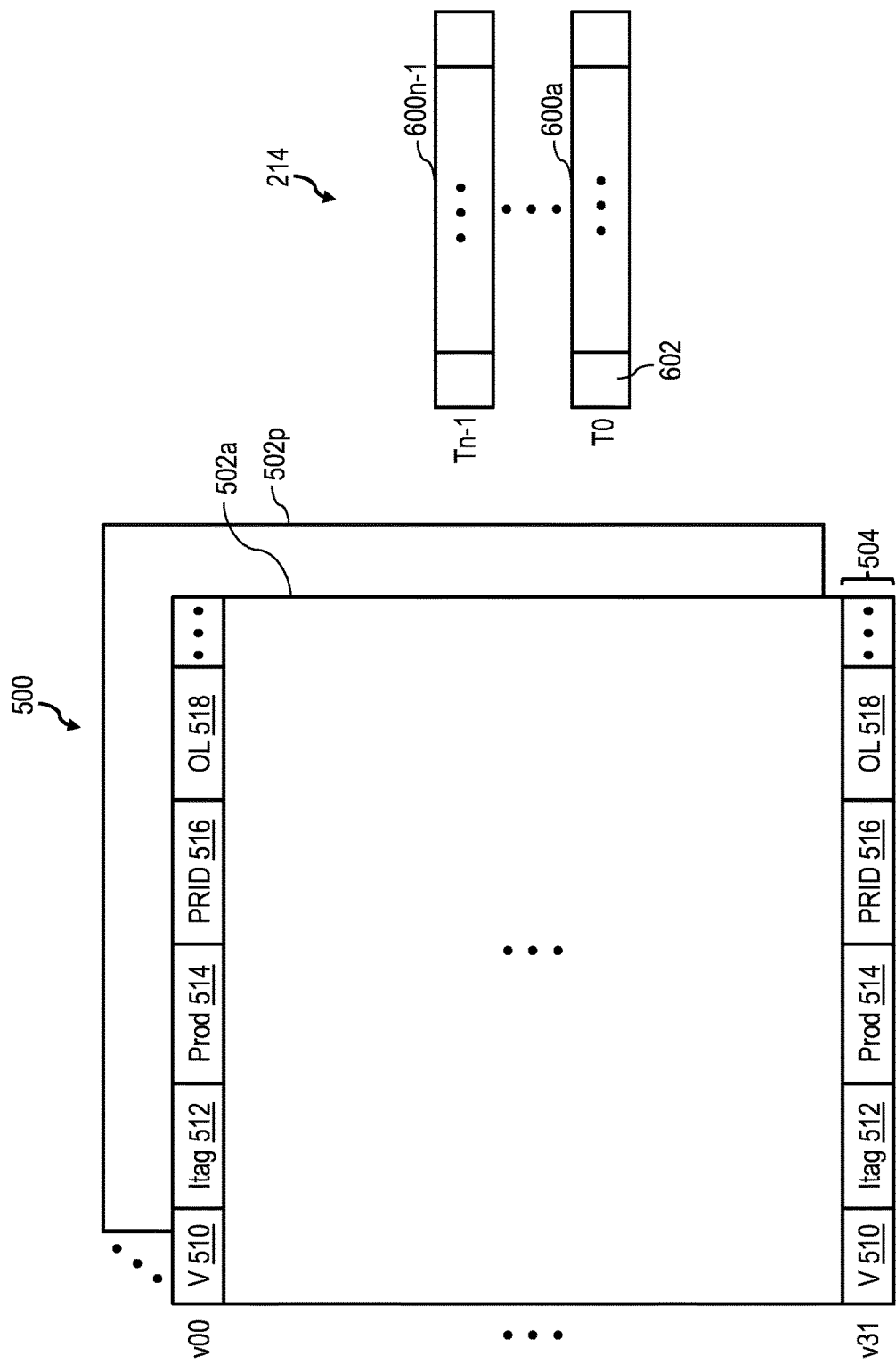
FIG. 5 is a high-level block diagram of a mapping table in accordance with one embodiment.
FIG. 6 is a high-level block diagram of prime state registers utilized to track the primed state of a non-architected register file in accordance with one embodiment.

With reference now to FIG. 5, there is illustrated a high-level block diagram of a portion of mapping table 212 in accordance with one embodiment. In the depicted embodiment, mapping table 212 includes a respective register map for each architected register file within processor 200. Thus, if processor 200 includes four architected register files, mapping table 212 will include four register maps. In this example, a register map 500 associated with architected register file 300 includes a map set 502a-502p for each simultaneous hardware thread of execution supported by processor 200. Each map set 502 includes a plurality of map entries 504, each corresponding to a respective logical or architected register in architected register file 300. Thus, for example, if architected register file 300 has 32 logical registers labeled v00 to v31, the associated map set(s) 502 will each include 32 map entries 504.

In the illustrated example, each map entry 504 includes multiple fields that enable mapping circuit 210 to track assignment of physical registers to logical register names. These fields includes a valid field 510 indicating whether the contents of that map entry 504 are valid, an instruction tag (itag) field 512 identifying by an instruction tag the instruction to which the associated logical register name is assigned, a producer (Prod) field 514 indicating, if applicable, which execution unit will produce the operand value for the logical register, and a physical register identifier (PRID) field 516 indicating the physical register among physical registers 400 to which that logical register name is mapped. In accordance with one embodiment, the fields within map entry 504 additionally include an overlay (OL) field 518 that indicates whether the logical register name is currently associated with a physical register in architected register file 300 or non-architected register file 316. For example, OL field 518 may be implemented as a two-bit decoded bit field in which a value of b'10' indicates an association between the logical register name 402 and a physical register 400 in architected register file 300 and a value of b'01' indicates an association between the logical register name 402 and a physical register 410 in non-architected register file 316. As noted above, in an embodiment in which non-architected registers 410 are sized such that each non-architected register 410 corresponds to multiple logical register names 402, it is preferred if those multiple logical registers are consecutive. Thus, assuming each physical register 410 in non-architected register file 316 has a length of 512 bits and each physical register 400 in architected register file 300 has a length of 128 bits, a current association between physical register 410a with logical register names v00-v03 may be indicated in the map entries 504 corresponding to logical register names v00-v03 by a value of b'01' in the OL fields 518 of those map entries 504.

Referring now to FIG. 6, there is depicted a high-level block diagram of prime state registers utilized to track the prime state information 214 for a non-architected register file in accordance with one embodiment. In the depicted example, mapper circuit 210 includes N prime state registers 600a-600n-1 (where N is a positive integer greater than or equal to one), each of which tracks prime state information for a respective one of the N simultaneous hardware threads supported by processor 200. Each prime state register 600 includes a plurality of bits 602, each indicating whether or not a corresponding one of physical registers 410 has been "primed" with operand data transferred from physical register(s) 400. For example, in one embodiment, a value of 1 indicates a "primed" state in which operand data has been transferred by transfer unit 320 from physical register(s) 400 into a particular physical register 410, and a value of 0 indicates a "de-primed" state in which operand data has not been transferred by transfer unit 320 from physical register(s) 400 into a particular physical register 410 or in which operand data has been transferred by transfer unit 320 from the particular physical register 410 to physical register(s) 400. As discussed below with reference to FIG. 7, processor 200 detects instruction sequences in which physical registers 400, 410 have not been properly "primed" or "de-primed" with known operand values and automatically transfers operand values between physical registers 400, 410 as needed to ensure correct execution results are produced.

Figure 7:
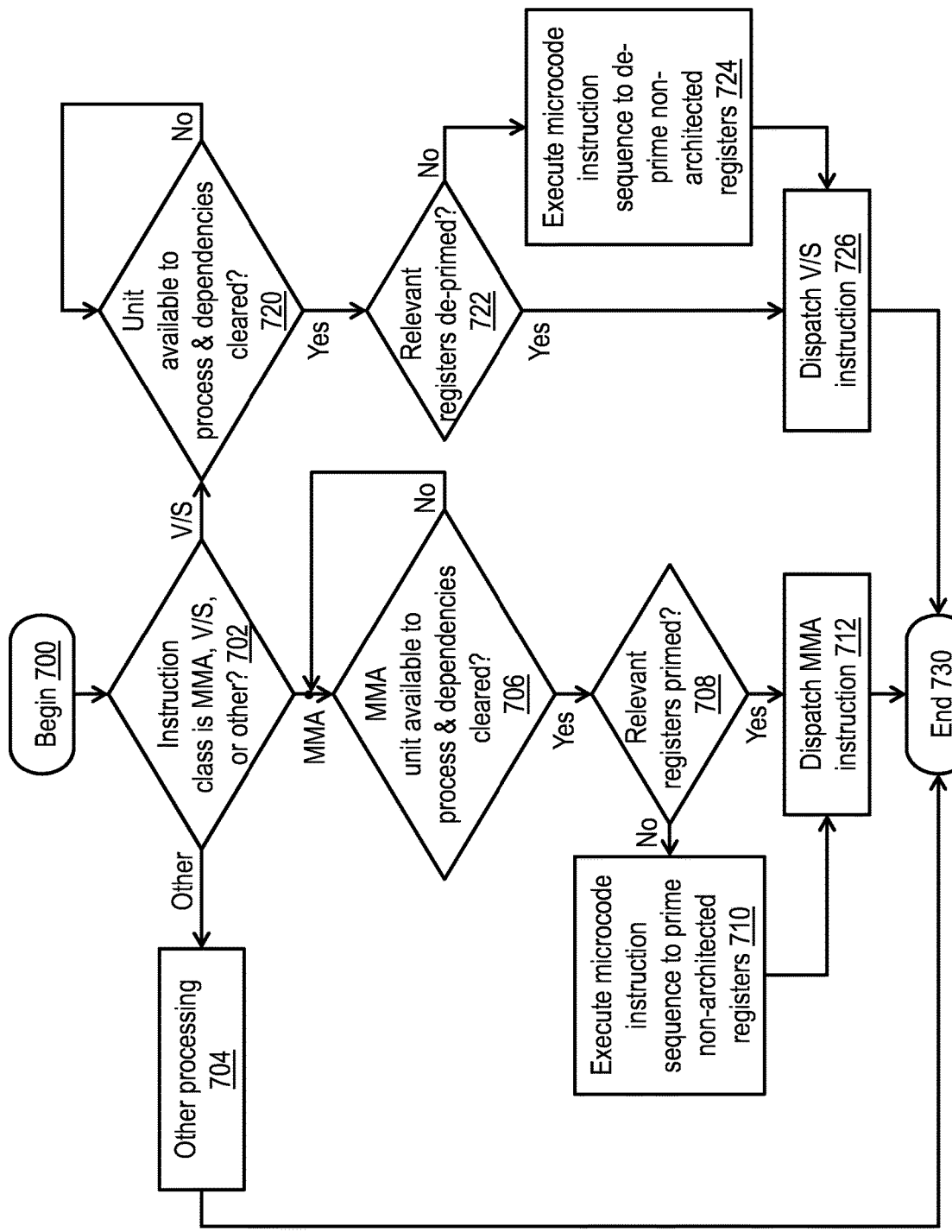
FIG. 7 is a high-level logical flowchart of an exemplary method of register management in accordance with one embodiment.

Referring now to FIG. 7, there is depicted a high-level logical flowchart of an exemplary method by which a processor provides intelligent management of values buffered in overlaid architected and non-architected register files in accordance with one embodiment. The process of FIG. 7 begins at block 700 and then proceeds to block 702, which illustrates dispatch circuit 216 of processor 200 receiving a next instruction in a sequence of instructions from mapper circuit 210 and determining whether or not the instruction belongs to a first class of instructions (e.g., vector/scalar instructions), a second class of instructions (e.g., MMA instructions), or a different third class of instructions. If dispatch circuit 216 detects at block 702 that the instruction belongs to a different third class of instructions, dispatch circuit 216 performs other processing at block 704, and the process thereafter ends at block 730. Referring again to block 702, if dispatch circuit 216 detects that the instruction is in the first class of instructions (e.g., vector/scalar instructions), the process passes to block 720 and following blocks, which are described below. If, however, dispatch circuit 216 detects that the instruction is in the second class of and instructions (e.g., MMA instructions), the process proceeds to block 706.

Block 706 depicts dispatch circuit 216 determining whether or not MMA unit 314 is available to process the MMA instruction and all data dependencies of the MMA instruction, if any, have been cleared. If not, dispatch circuit 216 waits to dispatch the instruction, as indicated by the process iterating at block 706. In response to an affirmative determination at block 706, the process proceeds to block 708, which illustrates dispatch circuit 216 determining whether or not the source operand register(s) of the MMA instruction have been "primed" by transfer unit 320 having previously transferred initial operand value(s) into the source operand register(s) accessed by the MMA instruction. In a preferred embodiment, dispatch circuit 216 makes the determination illustrated at block 708 by reference to the prime state information 214 recorded for the relevant hardware thread and source operand register(s) in one of prime state registers 600. In response to an affirmative determination at block 708, the process passes to block 712, which is described below. If, however, dispatch circuit 216 determines that the source operand register(s) of the MMA instruction have not been primed, dispatch circuit 216 automatically inserts into the instruction sequence of the hardware thread containing the MMA instruction a microcode instruction sequence of one or more non-user supplied instructions that cause transfer unit 320 to prime the source operand register(s) of the MMA instruction with operand values from physical registers 400 (block 710). In one example, for each 512-bit physical register 410 that is to be primed, a microcode instruction copies 512 bits of operand data from four 128-bit physical registers 400 in architected register file 300. The four physical registers 400 from which the 512 bits of operand data are copied are the ones mapped by mapping table 212 to the four consecutive logical register names 402 associated with the target 512-bit physical register 410 (e.g., v00-v03 for physical register 410a, ..., v28-v31 for physical register 410k).

Depending on implementation, dispatch circuit 216 may simply defer dispatch of the MMA instruction until after the microcode instruction sequence has been executed or may discard the MMA instruction, causing instruction fetch unit 202 to refetch the MMA instruction. Regardless of which implementation is selected, dispatch circuit 216, following verification that the source register(s) of the MMA instruction have been primed, dispatches the MMA instruction to issue queue 218 for eventual execution by MMA unit 314 by reference to non-architected register file 316 (block 712). Following block 712, the process of FIG. 7 ends at block 730.

Referring now to block 720, in response to dispatch circuit 216 determining an instruction awaiting dispatch is in the first class of instructions (e.g., vector/scalar instructions), dispatch circuit 216 determines whether or not the relevant one of units 302-312 is available to process the vector/scalar instruction and all data dependencies of the instruction, if any, have been cleared. If not, dispatch circuit 216 waits to dispatch the instruction, as indicated by the process iterating at block 720. In response to an affirmative determination at block 720, the process proceeds to block 722, which illustrates dispatch circuit 216 determining whether or not the source operand register(s) of the vector/scalar instruction are "de-primed." In a preferred embodiment, dispatch circuit 216 makes the determination illustrated at block 722 by reference to the prime state information 214 recorded for the relevant hardware thread and source operand register(s) in one of prime state registers 600. In response to an affirmative determination at block 722, the process passes to block 726, which is described below. If, however, dispatch circuit 216 determines that the source operand register(s) of the vector/scalar instruction are not "de-primed," dispatch circuit 216 automatically inserts into the instruction sequence of the hardware thread containing the vector-scalar instruction a microcode instruction sequence of one or more non-user-supplied instructions that cause transfer unit 320 to de-prime the source operand register(s) of the vector/scalar instruction with operand values from physical registers 410 (block 724). In one example of the de-prime process, a microcode instruction copies 512 bits of operand data from one 512-bit physical register 410 in non-architected register file 316 to four 128-bit physical registers 400 in architected register file 300. The four physical registers 400 into which the 512 bits of operand data are copied are the ones mapped by mapping table 212 to the four consecutive logical register names 402 associated with the source 512-bit physical register 410 (e.g., v00-v03 for physical register 410a, ..., v28-v31 for physical register 410k).

As noted above, depending on implementation, dispatch circuit 216 may simply defer dispatch of the vector-scalar instruction until after the microcode instruction sequence has been executed or may discard the vector-scalar instruction, causing instruction fetch unit 202 to refetch the vector-scalar instruction. Regardless of which of implementation is selected, dispatch circuit 216, following verification that the source register(s) of the vector-scalar instruction have been de-primed, dispatches the vector-scalar instruction to issue queue 218 for eventual execution by one of functional units 302-312 by reference to the physical register(s) 400 of architected register file 300 (block 726). Following block 726, the process of FIG. 7 ends at block 730.

Figure 8:
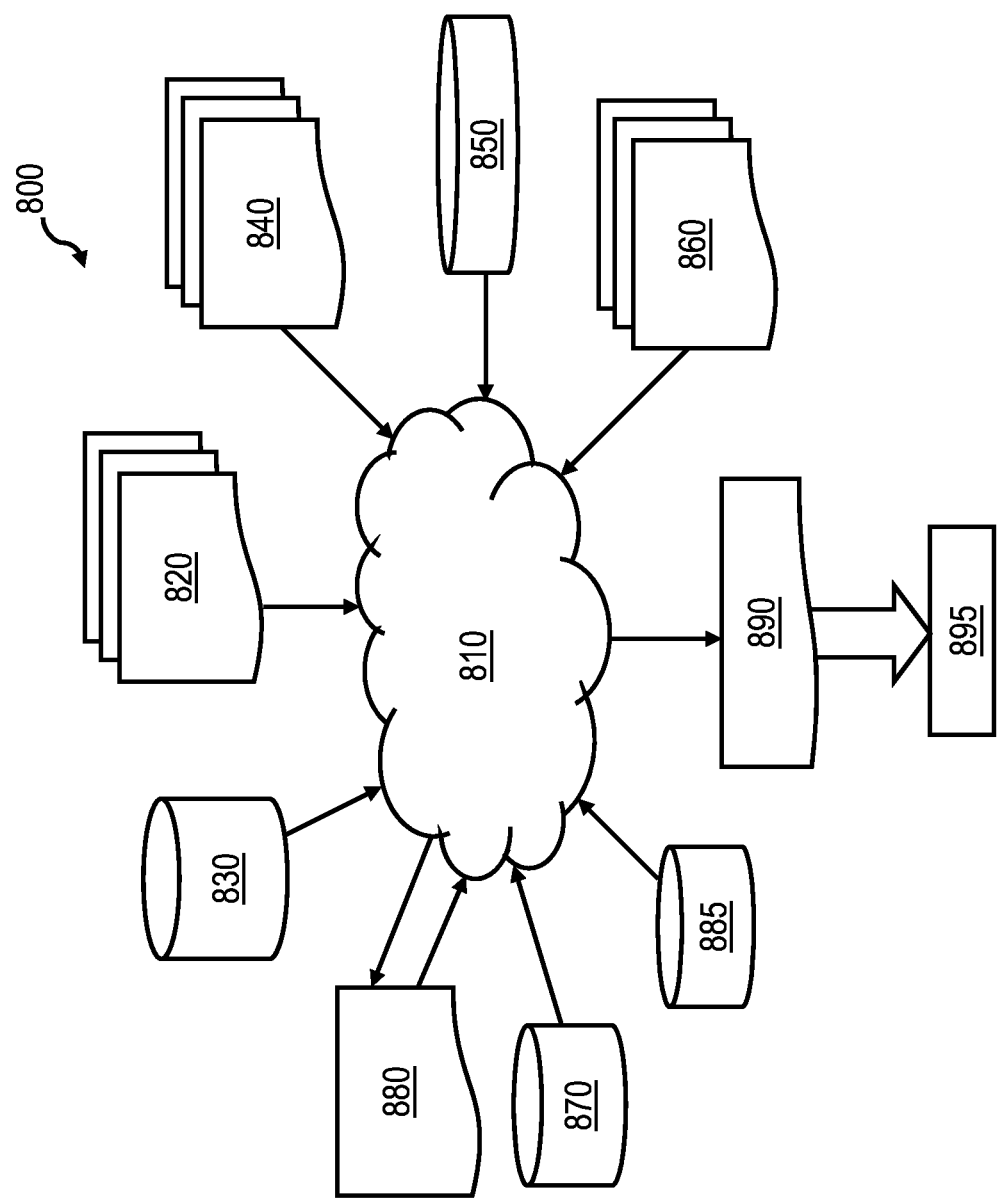
FIG. 8 is a block diagram of an exemplary design flow in accordance with one embodiment.

With reference now to FIG. 8, there is illustrated a block diagram of an exemplary design flow 800 used, for example, in semiconductor IC logic design, simulation, test, layout, and manufacture. Design flow 800 includes processes, machines and/or mechanisms for processing design structures or devices to generate logically or otherwise functionally equivalent representations of the design structures and/or devices described above and shown herein. The design structures processed and/or generated by design flow 800 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 800 may vary depending on the type of representation being designed. For example, a design flow 800 for building an application specific IC (ASIC) may differ from a design flow 800 for designing a standard component or from a design flow 800 for instantiating the design into a programmable array, for example a programmable gate array (PGA) or a field programmable gate array (FPGA) offered by Altera® Inc. or Xilinx® Inc.

FIG. 8 illustrates multiple such design structures including an input design structure 820 that is preferably processed by a design process 810. Design structure 820 may be a logical simulation design structure generated and processed by design process 810 to produce a logically equivalent functional representation of a hardware device. Design structure 820 may also or alternatively comprise data and/or program instructions that when processed by design process 810, generate a functional representation of the physical structure of a hardware device. Whether representing functional and/or structural design features, design structure 820 may be generated using electronic computer-aided design (ECAD) such as implemented by a core developer/designer. When encoded on a machine-readable data transmission, gate array, or storage medium, design structure 820 may be accessed and processed by one or more hardware and/or software modules within design process 810 to simulate or otherwise functionally represent an electronic component, circuit, electronic or logic module, apparatus, device, or system such as those shown herein. As such, design structure 820 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 810 preferably employs and incorporates hardware and/or software modules for synthesizing, translating, or otherwise processing a design/simulation functional equivalent of the components, circuits, devices, or logic structures shown herein to generate a netlist 880 which may contain design structures such as design structure 820. Netlist 880 may comprise, for example, compiled or otherwise processed data structures representing a list of wires, discrete components, logic gates, control circuits, PO devices, models, etc. that describes the connections to other elements and circuits in an integrated circuit design. Netlist 880 may be synthesized using an iterative process in which netlist 880 is resynthesized one or more times depending on design specifications and parameters for the device. As with other design structure types described herein, netlist 880 may be recorded on a machine-readable storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, or buffer space.

Design process 810 may include hardware and software modules for processing a variety of input data structure types including netlist 880. Such data structure types may reside, for example, within library elements 830 and include a set of commonly used elements, circuits, and devices, including models, layouts, and symbolic representations, for a given manufacturing technology (e.g., different technology nodes, 32 nm, 45 nm, 80 nm, etc.). The data structure types may further include design specifications 840, characterization data 850, verification data 860, design rules 870, and test data files 885 which may include input test patterns, output test results, and other testing information. Design process 810 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 810 without deviating from the scope and spirit of the invention. Design process 810 may also include modules for performing standard circuit design processes such as timing analysis, verification, design rule checking, place and route operations, etc.

Design process 810 employs and incorporates logic and physical design tools such as HDL compilers and simulation model build tools to process design structure 820 together with some or all of the depicted supporting data structures along with any additional mechanical design or data (if applicable), to generate a second design structure 890. Design structure 890 resides on a storage medium or programmable gate array in a data format used for the exchange of data of mechanical devices and structures (e.g., information stored in a IGES, DXF, Parasolid XT, JT, DRG, or any other suitable format for storing or rendering such mechanical design structures). Similar to design structure 820, design structure 890 preferably comprises one or more files, data structures, or other computer-encoded data or instructions that reside on transmission or data storage media and that when processed by an ECAD system generate a logically or otherwise functionally equivalent form of one or more of the embodiments of the invention shown herein. In one embodiment, design structure 890 may comprise a compiled, executable HDL simulation model that functionally simulates the devices shown herein.

Design structure 890 may also employ a data format used for the exchange of layout data of integrated circuits and/or symbolic data format (e.g., information stored in a GDSII (GDS2), GL1, OASIS, map files, or any other suitable format for storing such design data structures). Design structure 890 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown herein. Design structure 890 may then proceed to a stage 895 where, for example, design structure 890: proceeds to tape-out, is released to manufacturing, is released to a mask house, is sent to another design house, is sent back to the customer, etc.

As has been described, in at least one embodiment, a processor includes an architected register file including a first plurality of physical registers for buffering operands and a non-architected register file including a second plurality of physical registers for buffering operands. Each physical register in the non-architected register file has a correspondence with at least one logical register of the architected register file. The processor additionally includes an instruction fetch unit that fetches instructions to be executed and at least one execution unit configured to execute instructions. The at least one execution unit is configured to execute a first class of instructions that access operands in the architected register file and a second class of instructions that access operands in the non-architected register file. The processor also includes a mapper circuit that assigns physical registers within the first plurality of physical registers to the instructions to be executed for buffering of operands. The processor additionally includes a dispatch circuit that is configured, based on detection of an instruction to be executed in one of the first and second classes of instructions for which correct operands do not reside in a respective one of the architected register file and the non-architected register file, to automatically initiate transfer of operands between corresponding physical registers in the architected register file and the non-architected register file.

While various embodiments have been particularly shown and described, it will be understood by those skilled in the art that various changes in form and detail may be made therein without departing from the spirit and scope of the appended claims and these alternate implementations all fall within the scope of the appended claims.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Further, although aspects have been described with respect to a computer system executing program code that directs the functions of the present invention, it should be understood that present invention may alternatively be implemented as a program product including a computer-readable storage device storing program code that can be processed by a data processing system. The computer-readable storage device can include volatile or non-volatile memory, an optical or magnetic disk, or the like. However, as employed herein, a "storage device" is specifically defined to include only statutory articles of manufacture and to exclude signal media per se, transitory propagating signals per se, and energy per se.

The program product may include data and/or instructions that when executed or otherwise processed on a data processing system generate a logically, structurally, or otherwise functionally equivalent representation (including a simulation model) of hardware components, circuits, devices, or systems disclosed herein. Such data and/or instructions may include hardware-description language (HDL) design entities or other data structures conforming to and/or compatible with lower-level HDL design languages such as Verilog and VHDL, and/or higher level design languages such as C or C++. Furthermore, the data and/or instructions may also employ a data format used for the exchange of layout data of integrated circuits and/or symbolic data format (e.g. information stored in a GDSII (GDS2), GL1, OASIS, map files, or any other suitable format for storing such design data structures).

What is claimed is:

1. A processor, comprising:
  a semiconductor substrate having integrated circuitry formed therein, wherein the integrated circuitry includes:
    an architected register file including a first plurality of physical registers for buffering operands, wherein the first plurality of physical registers are referenced utilizing logical register names and wherein a number of physical registers in the first plurality of physical registers is greater than a number of the logical register names;
    a non-architected register file including a second plurality of physical registers for buffering operands, wherein each physical register in the non-architected register file has a fixed correspondence with at least one of the logical register names of the architected register file;
    an instruction fetch unit that fetches instructions to be executed;
    at least one execution unit configured to execute instructions, wherein the at least one execution unit is configured to execute a first class of instructions that access operands in the architected register file and a second class of instructions that access operands in the non-architected register file;
    a mapper circuit that assigns physical registers within the first plurality of physical registers to the instructions to be executed for buffering of operands by creating transient mappings between the logical register names and physical registers within the first plurality of physical registers; and
    a dispatch circuit that is configured, based on detection of an instruction to be executed in one of the first and second classes of instructions for which correct operands do not reside in a respective one of the architected register file and the non-architected register file, to automatically initiate transfer of operands between corresponding physical registers in the architected register file and the non-architected register file.

2. The processor of claim 1, wherein:
  the dispatch circuit automatically initiates transfer of operands from at least one physical register in the architected register file to at least one physical register in the non-architected register file in advance of execution of an instruction in the second class.

3. The processor of claim 1, wherein:
  the dispatch circuit automatically initiates transfer of operands from at least one physical register in the non-architected register file to at least one physical register in the architected register file in advance of execution of an instruction in the first class.

4. The processor of claim 1, wherein:
  each physical register in the non-architected register file has a fixed correspondence to a respective plurality of logical register names of the architected register file.

5. The processor of claim 1, wherein the first class of instructions access source operands having a different data type than source operands of instructions in the second class.

6. The processor of claim 1, wherein the processor maintains a state indicator configured to indicate whether or not the operands have been transferred from the physical registers of the architected register file to the physical registers of the non-architected register file.

7. The processor of claim 1, wherein:
  the dispatch circuit initiates the transfer of operands between physical registers in the architected register file and the non-architected register file by dispatching a microcode instruction sequence for execution.

8. A data processing system, comprising:
  multiple processors, including the processor of claim 1;
  a shared memory; and
  a system interconnect communicatively coupling the shared memory and the multiple processor.

9. A method of data processing in a processor, said method comprising:
  buffering operands in an architected register file including a first plurality of physical registers, wherein the first plurality of physical registers are referenced utilizing logical register names and wherein a number of physical registers in the first plurality of physical registers is greater than a number of the logical register names;
  buffering operands in a non-architected register file including a second plurality of physical registers, wherein each physical register in the non-architected register file has a fixed correspondence with at least one of the logical register names of the architected register file;
  fetching, by an instruction fetch unit, a set of instructions to be executed, wherein the set of instructions includes instructions in a first class of instructions that access operands in the architected register file and instructions in a second class of instructions that access operands in the non-architected register file;
  assigning, by a mapper circuit, physical registers within the first plurality of physical registers to the set of instructions to be executed for buffering of operands by creating transient mappings between the logical register names and physical registers within the first plurality of physical registers;
  based on detection of an instruction to be executed in one of the first and second classes of instructions for which correct operands do not reside in a respective one of the architected register file and the non-architected register file, automatically initiating transfer of operands between corresponding physical registers in the architected register file and the non-architected register file; and executing the set of instructions in at least one execution unit.

10. The method of claim 9, wherein automatically initiating transfer includes automatically initiating transfer of operands from at least one physical register in the architected register file to at least one physical register in the non-architected register file in advance of execution of an instruction in the second class.

11. The method of claim 9, wherein automatically initiating transfer includes automatically initiating transfer of operands from at least one physical register in the non-architected register file to at least one physical register in the architected register file in advance of execution of an instruction in the first class.

12. The method of claim 9, wherein:
each physical register in the non-architected register file has a fixed correspondence to a respective plurality of logical register names of the architected register file.

13. The method of claim 9, wherein the first class of instructions access source operands having a different data type than source operands of instructions in the second class.

14. The method of claim 9, wherein the processor maintains a state indicator configured to indicate whether or not the operands have been transferred from the physical registers of the architected register file to the physical registers of the non-architected register file.

15. The method of claim 9, wherein:
initiating the transfer of operands between physical registers in the architected register file and the non-architected register file includes dispatching a microcode instruction sequence for execution.

16. A design structure tangibly embodied in a machine-readable storage device for designing, manufacturing, or testing an integrated circuit, the design structure comprising:
a processor, including:
an architected register file including a first plurality of physical registers for buffering operands, wherein the first plurality of physical registers are referenced utilizing logical register names and wherein a number of physical registers in the first plurality of physical registers is greater than a number of the logical register names;
a non-architected register file including a second plurality of physical registers for buffering operands, wherein each physical register in the non-architected register file has a fixed correspondence with at least one of the logical register names of the architected register file;
an instruction fetch unit that fetches instructions to be executed;
at least one execution unit configured to execute instructions, wherein the at least one execution unit is configured to execute a first class of instructions that access operands in the architected register file and a second class of instructions that access operands in the non-architected register file;
a mapper circuit that assigns physical registers within the first plurality of physical registers to the instructions to be executed for buffering of operands by creating transient mappings between the logical register names and physical registers within the first plurality of physical registers; and
a dispatch circuit that is configured, based on detection of an instruction to be executed in one of the first and second classes of instructions for which correct operands do not reside in a respective one of the architected register file and the non-architected register file, to automatically initiate transfer of operands between corresponding physical registers in the architected register file and the non-architected register file.

17. The design structure of claim 16, wherein:
the dispatch circuit automatically initiates transfer of operands from at least one physical register in the architected register file to at least one physical register in the non-architected register file in advance of execution of an instruction in the second class.

18. The design structure of claim 16, wherein:
the dispatch circuit automatically initiates transfer of operands from at least one physical register in the non-architected register file to at least one physical register in the architected register file in advance of execution of an instruction in the first class.

19. The design structure of claim 16, wherein:
each physical register in the non-architected register file has a fixed correspondence to a respective plurality of logical register names of the architected register file.

20. The design structure of claim 16, wherein the processor maintains a state indicator configured to indicate whether or not the operands have been transferred from the physical registers of the architected register file to the physical registers of the non-architected register file.

* * * * *